United States Patent [19]

Yamamoto et al.

[11] 4,342,231
[45] Aug. 3, 1982

[54] DIFFERENTIAL PRESSURE TRANSMITTER

[75] Inventors: Yoshimi Yamamoto, Ibaraki; Yoshitaka Matsuoka, Mito; Syozo Kasai; Yukio Takahashi, both of Katsuta; Takeo Nagata, Hitachi; Akira Nagasu, Ibaraki; Tomomasa Yoshida, Mito; Satoshi Shimada, Hitachi, all of Japan

[73] Assignee: Hitachi, Ltd., Tokyo, Japan

[21] Appl. No.: 217,025

[22] Filed: Dec. 16, 1980

[30] Foreign Application Priority Data

Dec. 19, 1979 [JP] Japan .................................. 54-164126

[51] Int. Cl.³ ............................ G01L 7/08; G01L 9/06
[52] U.S. Cl. ........................................ 73/721; 73/706; 73/727
[58] Field of Search ................. 73/721, 720, 727, 726, 73/706, 708

[56] References Cited

U.S. PATENT DOCUMENTS

| | | | |
|---|---|---|---|
| 3,712,143 | 1/1973 | Weaver et al. | 73/720 |
| 4,072,058 | 2/1978 | Whitehead | 73/720 |
| 4,127,840 | 11/1978 | House | 73/727 |
| 4,135,408 | 1/1979 | Di Giovanni | 73/721 |
| 4,173,149 | 11/1979 | Critten | 73/720 |

Primary Examiner—Donald O. Woodiel
Attorney, Agent, or Firm—Craig and Antonelli

[57] ABSTRACT

A differential pressure transmitter has a pressure receiving portion and a sensor portion which are constituted from separate parts separably jointed with each other. The sensor portion includes a semiconductor sensor having one side formed with a resistance pattern and the other side which has a thick-walled peripheral portion and a thick-walled central portion. The semiconductor sensor is incorporated in the sensor portion as being supported at the thick-walled peripheral portion thereof. The pressure receiving portion includes seal diaphragms disposed on both sides of the pressure receiving portion and a central diaphragm disposed therein. The semiconductor sensor is arranged such that the side thereof carrying the resistance pattern faces the pressure receiving portion.

11 Claims, 9 Drawing Figures

DIFFERENTIAL PRESSURE TRANSMITTER

BACKGROUND OF THE INVENTION

The present invention relates to a differential pressure transmitter having a semiconductor sensor adapted to convert a differential pressure between pressures of a high-pressure fluid and a low-pressure fluid into an electric signal.

The semiconductor sensor of conventional differential pressure transmitter of the kind described usually has a resistance pattern formed by a diffusion process on a semiconductor substrate such as of silicon or the like. The pressure of the high-pressure fluid is transmitted to one side of the semiconductor sensor through a high-pressure side seal diaphragm and a high-pressure side fill liquid, while the other side of the semiconductor sensor receives the pressure of the low-pressure fluid through the low-pressure side seal diaphragm and the low-pressure side fill liquid. The arrangement is such that the differential pressure between the pressures of the high and low pressure fluids is converted by the resistance pattern of the semiconductor sensor into an electric signal of a level corresponding to the differential pressure.

The use of the semiconductor sensor has contributed to the improvement in the measuring precision and reliability. However, there still are the following requirements for differential pressure transmitter having stable performance and compact construction.

Firstly, it is required that organic materials such as "O" ring, flexible printed board or the like are not present in the region filled with the fill liquid.

If a flexible printed board is used for delivering the electric signal from the semiconductor sensor to the outside, the organic material of the flexible printed board is inconveniently dissolved in the fill liquid. Similarly, "O" rings in such region filled with the fill liquid is dissolved by the fill liquid. The liquid in which the organic material is dissolved contaminates or adversely affects the resistance pattern of the semiconductor sensor to degrade the quality of the electric signal transmitted from the transmitter.

Second requisite is to minimize the single-side pressure effect and the static pressure effect. Supposing that the maximum operating fluid pressure is applied alternately to the respective sides of the semiconductor sensor, to only one side of the sensor at a time, there remains an offset of the zero point after the removal of the pressure. The magnitude of this offset at each side is referred to as the single-side pressure effect. Also, the term "static pressure effect" is used herein to mean the offset of the zero point when the maximum operating pressures are applied simultaneously to both sides from the zero point under application of no pressure to both sides of the semiconductor sensor.

The third requisite is to effect a suitable overload protection; i.e., to protect the semiconductor sensor, which receives at its both sides widely varying pressures, from being subjected to damage or breakage due to excessive deflection caused by application of excessively high fluid pressure.

The fourth requisite is to constitute the pressure receiving portion and the sensor portion of the sensor from separately constructed ports separately attached together, so as to facilitate the pick-up of the electric signal and fabrication and to make the sensor as a whole compact.

SUMMARY OF THE INVENTION

It is, therefore, a principal object of the invention to provide a differential pressure transmitter incorporating therein a semiconductor sensor, which has a compact construction and improved stability and is capable of satisfying the requirements mentioned above.

To this end, according to the invention, there is provided a differential pressure transmitter in which the pressure receiving portion and the sensor portion are constructed from separate parts separably attached to each other. The sensor portion of the transmitter has a semiconductor sensor which includes a single crystal silicon diaphragm, the side of which opposite to the side having the resistor is thick-walled at its peripheral portion and central portion, and a supporting member supporting the silicon diaphragm at the peripheral part of the latter. The pressure receiving portion includes, in addition to seal diaphragms provided at both sides of the pressure receiving portion and adapted to face the high pressure fluid and the low pressure fluid, a central diaphragm disposed at the inside of the pressure receiving portion and adapted to protect the semiconductor sensor from overload. The fluid pressures are introduced to both sides of the semiconductor sensor through passages or conduits provided in the pressure receiving portion and the sensor portion. In the sensor portion, the semi-conductor sensor is disposed such that its side having the resistance formed thereon faces the pressure receiving portion.

DESCRIPTION OF THE PREFERRED EMBODIMENT

Figure 1:
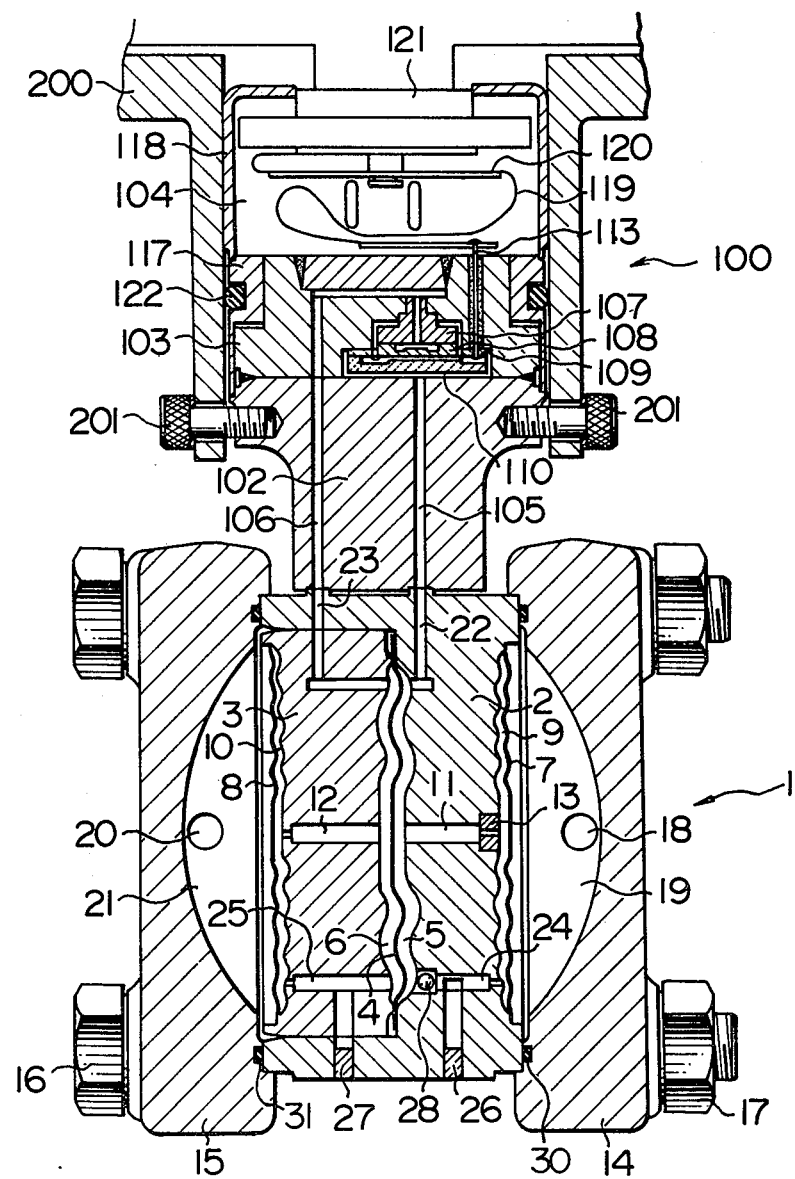
FIG. 1 is a sectional view of a differential pressure transmitter constructed in accordance with an embodiment of the invention.

FIG. 1 is a sectional view of a differential pressure transmitter constructed in accordance with an embodiment of the invention. The differential pressure transmitter has a pressure receiving portion 1 and a sensor portion 100 which are constituted from separate parts separably attached to each other. The pressure receiving portion 1 has two pressure receiving bodies 2, 3 which are made of, for example, stainless steel. As will be seen from this Figure, the pressure receiving body 2 has a substantially U-shaped crosssection, while the pressure receiving body 3 fits in the pressure receiving body 2. A corrugated flexible central diaphragm 4 is clamped between both pressure receiving bodies 2, 3, so that two isolated chambers 5, 6 are formed between two pressure receiving bodies 2, 3. This central diaphragm 4 is made of a stainless steel having a stiffness higher than that of a high-pressure side seal diaphragm 7 and a low-pressure side seal diaphragm 8 which will be mentioned later. The central diaphragm 4 is secured at its peripheral portion to the pressure receiving portion 2 by an electron beam welding. Also, the pressure receiving body 3 is welded by electron beam welding to the pressure receiving body 2 in the fitting relation to the latter.

The aforementioned high-pressure side seal diaphragm 7 and the low-pressure side seal diaphragm 8, which are also corrugated and flexible, are disposed at the outside of the pressure receiving bodies 2, 3. A high pressure receiving chamber 9 is formed between the high-pressure side seal diaphragm 7 and the pressure receiving body 2, while a low pressure receiving chamber 10 is defined between the low-pressure side seal diaphragm 8 and the pressure receiving body 3. Both diaphragms 7, 8 are made of a stainless steel having a high corrosion resistance, and are secured at their peripheral parts to the associated pressure receiving bodies by electron beam welding. The isolated chamber 5 of the high-pressure side is communicated with the high pressure receiving chamber 9 through a passage or conduit 11. Similarly, the isolated chamber 6 of the low-pressure side communicates with the low pressure receiving chamber 10 through a passage or conduit 12. A fixed damper 13 is disposed in the conduit 11 of the high-pressure side to suppress an abrupt change of the pressure of high pressure fluid, as well as pulsation.

The pressure receiving bodies having three diaphragms 4, 7 and 8 are fastened to a high-pressure side flange 14 and a low-pressure side flange 15, through the mediums of packings 30, 31, by means of bolts 16 and nuts 17. The high-pressure side flange 14 is provided with a high-pressure fluid inlet port 18 through which the high pressure fluid is introduced into the pressure receiving portion, and the flange 14 partly defines a high-pressure fluid chamber 19 into which the high pressure fluid is introduced through the port 18. The high pressure fluid introduced into the chamber 19 exerts a pressure on the seal diaphragm 7. Similarly, the low-pressure side flange 15, having a low-pressure fluid inlet port 20, partly defines a low-pressure fluid chamber 21. The pressure receiving bodies 2, 3 are provided therein with a high-pressure conduit or passage 22 and a low-pressure conduit or passage 23 through which the pressure in the isolated chambers 5, 6 are transmitted to a semiconductor sensor 108 which will be explained later.

As described hereinbefore, one 2 of the pressure receiving bodies has a substantially U-shaped cross-section and the other 3 fits in the latter. In addition, the high-pressure side flange 14 and the low-pressure side flange 15 are fastened only to the pressure receiving body 2. It will be seen that this arrangement minimizes the unfavourable phenomena such as distortion or warp of the central diaphragm 4 due to an uneven or excessive fastening force. An incompressible fill liquid having a high insulating property, e.g. silicon oil, is confined in the chambers 5, 6, 9, 10 defined by the pressure receiving bodies 2, 3 and by three diaphragms 4, 7, 8, in the conduits 11, 12, 22, 23 and at both sides of the semiconductor sensor 108. This liquid is charged through liquid filling passages 24, 25 which are closed and sealed by plugs 26, 27 after the filling. The portion of the high-pressure side filling passage 24 facing the central diaphragm 4 has a steel ball 28 disposed therein. The diameter of the steel ball 28 is greater than that of the filling passage 24.

Next, a description will be made on the sensor portion 100. The sensor portion 100 includes three major parts: namely, a connecting metal member 102, a sealing metal member 103 and a casing portion 104 receiving therein connectors and the like. The connecting member 102 is provided with passages or conduits 105, 106 which are in communication with the high-pressure side conduit 22 and the low-pressure side conduit 23 of the pressure receiving bodies 2, 3. The connecting member 102 is made of stainless steel and is secured to the pressure receiving body 2 by an electron beam welding.

For fitting the differential pressure transmitter of this embodiment to a variety of pipes, only the flanges 14, 15 are changed to meet the diameter of the pipe to which the transmitter is to be connected. Thus, the size of the connecting member 102 is determined in accordance with the maximum diameter of the usable pipes.

Figure 2A:
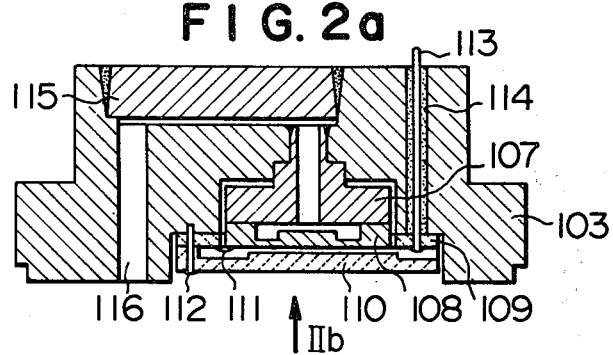
FIGS. 2a and 2b are illustrations of detail of a sensor portion of the differential pressure transmitter shown in FIG. 1.
Figure 2B:
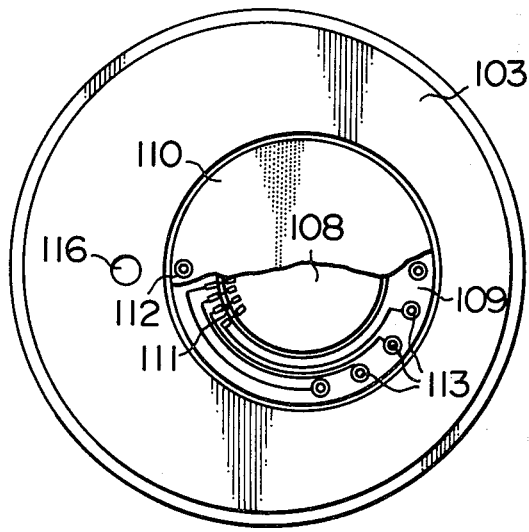

FIGS. 2a and 2b show the detail of the sealing member 103. More specifically, FIG. 2a is an enlarged view of the sealing member 103 shown in FIG. 1, while FIG. 2b is an end view of the sealing member as viewed in the direction of arrow IIb of FIG. 2a.

To a hollow supporting member 107 made of Fe-Ni alloy, Fe-Ni-Co alloy or the like is attached a semiconductor sensor 108 made of silicon single crystal. The attachmenet of the semiconductor sensor 108 to the supporting member 107 may be made with the use of an adhesive such as gold-silicon eutectic alloy. However, from the viewpoints of gastightness, static pressure effect and single-side pressure effect, it is preferred to interpose a thin glass layer between the supporting member 107 and the semiconductor sensor 108 and to unite the semiconductor sensor 108, the glass layer and the supporting member 107 by known anode bonding method.

It is also preferred to use as the material of the supporting member 107 a material having a thermal expansion coefficient and Young's modulus which are substantially same as those of the material of the semiconductor sensor 108. The semiconductor sensor 108 has an increased thickness at its peripheral portion adapted to be secured to the member 107 and central portion. The resistance pattern is formed on the thin-walled portion near the thick-walled central portion and thin-walled portion near the thick-walled peripheral portion, at the side of the semiconductor sensor 108 opposite to the supporting member 107, i.e. at the side adjacent to the ceramic protecting cover 110. The semiconductor sensor 108 is formed of an n-type single crystal silicon with (110) crystal plane or (211) crystal plane. Preferably, the resistance pattern is formed along the radial direction of <111> axis direction in which the maximum sensitivity is obtained by p-type gauge. The wiring of the resistance pattern is made by a doughnut-like ceramic substrate 109 disposed on the sealing member 103 so as to surround the semiconductor sensor 108, in such a manner as to form a Wheatstone bridge. The wiring between the semiconductor sensor 108 and the ceramic substrate 109 is achieved by a wire-bonded lead wire 111. Lead wires 113 for transmitting the electric signal from the ceramic substrate 109 to the outside extend through the sealing member 103 and are partially exposed to the outside. A hermetic seal 114 is provided in the passage through which the lead wires 113 extend, so as to seal the internal space of the sealing member 103 from the exterior. The lead wires 113 are soldered at their other ends to the ceramic substrate 109. The ceramic protecting cover 110 for protecting the resistance pattern of the semiconductor sensor 108 and the lead wire 111 is secured by means of a retainer pin 112 to the sealing member 103.

The sealing member 103, to which the semiconductor sensor 108 is attached in the manner explained above, is bonded to the connecting member 102 by an electron beam welding. Thereafter, the plate 115 is bonded to the sealing member 103 by an electron beam welding. The sealing member 103 and the plate 115 are preferably made of stainless steel.

Consequently, the spaces defined at both sides of the semiconductor sensor 108, to which the pressures of the high-pressure fluid and low-pressure fluid act, are completely separated from each other and perfectly sealed from the exterior. As explained before, both spaces are filled with fill liquid.

The fluid pressure of the low-pressure side is introduced to act on one side of the semiconductor sensor 108 through the conduit 106, conduit or passage 116 defined by the sealing member 103 and the plate 115, and the internal cavity or bore of the supporting member 107. Meanwhile, the fluid pressure of the high pressure side is introduced to act on the other side of the semiconductor sensor 108 through the conduit 105, space defined by the connecting member 102 and the ceramic protecting cover 110 and the space defined by the ceramic protecting cover 110 and the other side of the semiconductor sensor 108.

According to this arrangement, no organic material exists in the spaces filled with the fill liquid, so that the unfavourable effect on the semiconductor sensor 108, attributable to dissolution of the organic material into the liquid, is completely avoided. Also, for the reason explained below, the single-side pressure effect and the static pressure effect are very much diminished due to the provision of thick-walled portion at the center of the semiconductor sensor 108. Namely, when a static pressure is applied to the semiconductor sensor 108, a compressive strain component and a radially tensed strain component are generated in the resistance pattern. These strain components, however, are conveniently negated by each other so that no change of the output is caused by the static pressure. The same applies, needless to say, also to the single-side pressure.

The semiconductor sensor having thick-walled central portion produces the following advantage when it is incorporated in the differential pressure transmitter. In some cases, it is required to reverse the high and low pressure sides of the transmitter, by connecting the high-pressure fluid introduction port and the low-pressure fluid introduction port to the low and high-pressure fluids, respectively. For such uses, the conventional differential pressure transmitter is required to have suitable output adjusting mechanism to compensate for the change of the output characteristic of the transmitter after the switching. In addition, it is difficult and troublesome to operate the adjusting mechanism. This problem is advantageously avoided by the present invention because, in the differential pressure transmitter of the invention, there is no substantial change of the output characteristic of the semiconductor sensor when the connections to the high and low-pressure sides are reversed, so that the adjusting mechanism and the troublesome adjusting operation necessitated with the conventional differential pressure transmitter are completely avoided.

A description will be made hereunder as to the overload protection. The central diaphragm 4 has a stiffness high enough to prevent the same from being seated on the pressure receiving body 2 or 3 even when either one of the high-pressure side seal diaphragm 7 and the low-pressure side seal diaphragm 8 is seated on the pressure receiving body 2 or 3 due to an excessive pressure acting thereon. Therefore, the application of excessive fluid pressure to one side of the semiconductor sensor through the fill liquid is prevented; thus the damage and breakage of the semiconductor sensor 108 is prevented.

It is considered that, even when the sealing member 103 is made of a high corrosion resistant material such as stainless steel as in the case of embodiment shown in FIG. 1, the corrosion resistance is lowered due to the high temperature to which the sealing member 103 is subjected during formation of the hermetic seal 114 or due to the presence of a plurality of weld points. Since the differential pressure transmitters are often used under unfavourable conditions of use such as those in chemical plants or the like, it is necessary that the differential pressure transmitter has a sufficiently high resistance against corrosion. The sealing member cover 117 shown in FIG. 1, made of stainless steel, is provided for protecting the interior against corrosion.

Figure 3A:
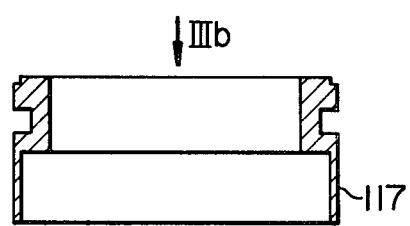
FIGS. 3a and 3b are illustrations of detail of a sealing member incorporated in the differential pressure transmitter shown in FIG. 1.
Figure 3B:
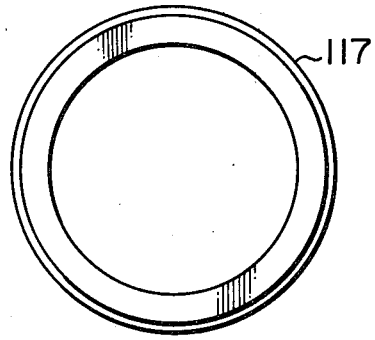

FIGS. 3a and 3b show the detail of the sealing member cover 117. More specifically, FIG. 3a is a sectional view, while FIG. 3b is a view seen in the direction of arrow IIIb. As will be seen from these Figures, the sealing member cover 117 has a thick-walled portion and a thin-walled portion. The thick-walled portion is provided with a groove for receiving "O" ring 122. An end portion of the thin-walled portion is bonded to the connecting member 102 shown in FIG. 1 by electron beam welding.

As shown in FIG. 1, a connector cover 118 is connected to the end of the thick-walled portion of the sealing member cover 117 by electron beam welding, such that the connector cover 118 forms the aforementioned casing portion 104 for encasing connectors and so forth. The casing portion 104 encases the lead wire 113, a compensation substrate 120 to which is attached a thermistor or the like for making a temperature compensation of the electric signal derived through the lead wire 113 from the semiconductor sensor 108, a flexible printed circuit board 119 for providing an electric connection of these elements and a connector 121 for connecting these elements to an amplifier section which is not shown. The amplifier section is accomodated in an amplifier case 200, and is adapted to amplify the electric signal corresponding to the differential pressure between the high-pressure fluid and the low-pressure fluid sensed by the semiconductor sensor 108 to form the signal to be delivered to a meter for indicating the level of the signal. The amplifier section may also produce an output signal which is to be delivered to the outside.

The amplifier case 200 is fixed to the connecting member 102 with fixing bolts 201 with the "O" ring 122 interposed therebetween.

Figure 4:
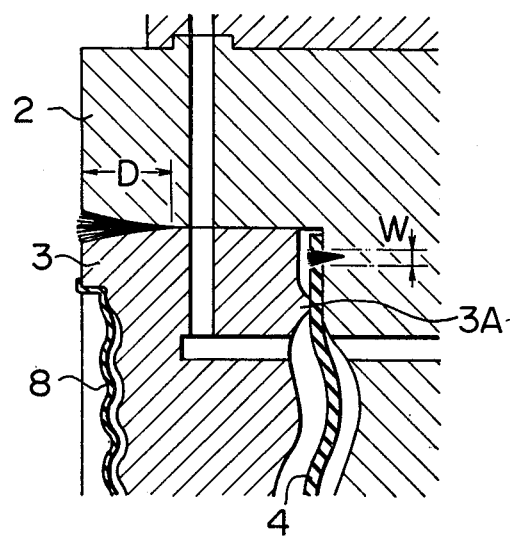
FIG. 4 is an enlarged view showing a part of a pressure receiving portion of the differential pressure transmitter shown in FIG. 1.

FIG. 4 shows the detail of a portion of the pressure receiving portion. As stated before, the pressure receiving body 2 has a substantially U-shaped cross-section and the pressure receiving body 3 fits in the pressure receiving body 2 and welded to the latter by electron beam welding. The electron beam welding is employed to prevent the pressure receiving bodies from being distorted or deflected under application of static pressure and single-side pressure, i.e. to increase the rigidity of the pressure receiving bodies. Therefore, the pressure receiving bodies are not distorted and no substantial problem is caused while the pressure applied is low. However, as the pressure is increased, the upper and lower surface of the pressure receiving bodies, particularly the pressure receiving body 2, are distorted to cause some error. It is possible to avoid this error by increasing the rigidity through selecting the thickness of the pressure receiving body greater. This, however, is inconveniently accompanied by an increase of the size.

Figure 5:
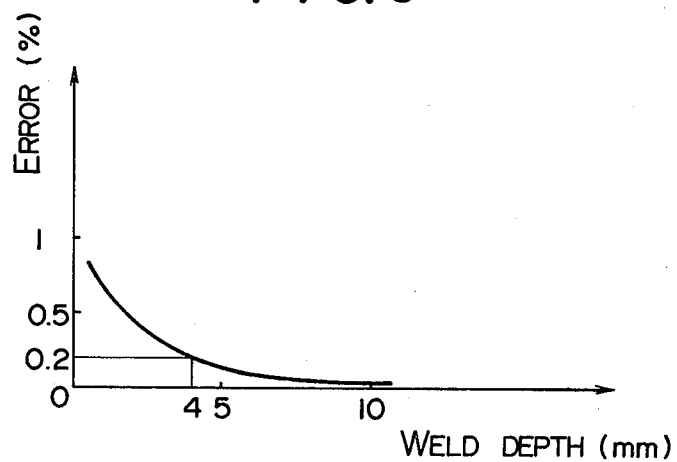
FIG. 5 is an illustration of the relationship between the weld depth and error.

The inventors have found, as a result of a study on the relationship between the weld depth and the ridigity, that the ridigity is increased to a satisfactory level by employing a large weld depth D as shown in FIG. 5. It was also ascertained that weld depth D not smaller than 4 mm maintains the error within the level of 0.2% which is required for the differential pressure transmitter to operate stably over a long period of time.

An explanation will be made hereunder as to the mounting of the central diaphragm 4.

The central diaphragm is required to exhibit an equal characteristic when it receives pressures of the same level at either side. To this end, the following two problems should be solved.

(1) To equalize the movable areas of the central diaphragm at the high-pressure side and low-pressure side.

(2) To impart a tension to the central diaphragm to eliminate any warp.

The first problem (1) above is achieved by providing the pressure receiving body 3 with a projection 3A and pressing by this projection 3A the inner side of the welded part of the central diaphragm 4. According to this arrangement, the movable area of the central diaphragm 4 is determined by the projection 3A, so that equal movable area is formed at the high-pressure side and the low-pressure side of the central diaphragm.

Figure 6:
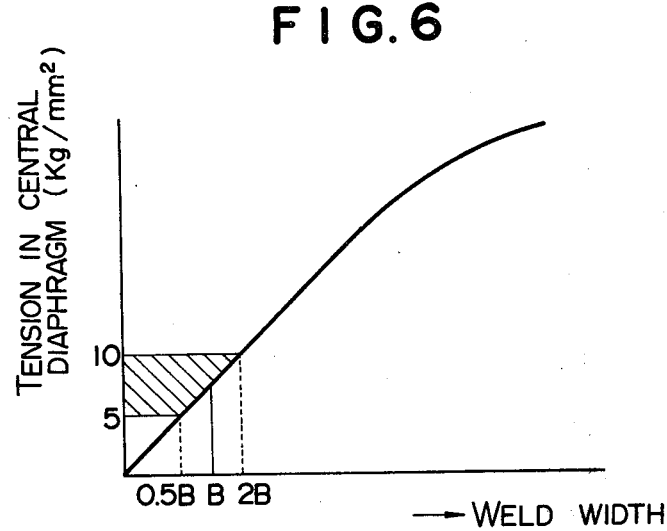
FIG. 6 is an illustration of the relationship between the weld width and the tension in the central diaphragm.

The problem (2) above is achieved by optimizing the width W of the welding of the central diaphragm to the pressure receiving body 2. Namely, as shown in FIG. 6, the tension in the central diaphragm is increased as the weld width W becomes greater. The tension in the central diaphragm 4 is ideally 5 to 10 Kg/mm². To make the tension fall within the above-specified range, it is preferred to select the weld width W equal to the thickness B of the central diaphragm 4. More specifically, the tension falls within the ideal range as illustrated in FIG. 6 when the weld width W is selected between 0.5 and 2 times as large as the thickness of the central diaphragm.

As will be understood from the foregoing description, in the differential pressure transmitter of the invention, the pressure receiving portion 1 having the pressure receiving bodies 2, 3, and the sensor portion 100 having the connecting member 102, sealing member 103 and the connector casing 104 are constructed separately and superposed one on the other to constitute the differential pressure transmitter. Therefore, the differential pressure transmitter of the invention has a compact construction and is easy to fabricate.

Figure 7:
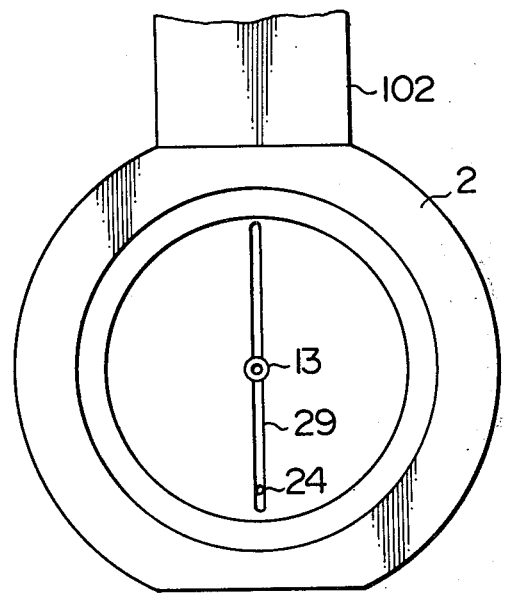
FIG. 7 shows the body of the pressure receiving portion devoid of the high-pressure side seal diaphragm.

FIG. 7 shows the pressure receiving side of the pressure receiving body 2 devoid of the high-pressure side seal diaphragm. It will be seen that a groove 29 is formed to extend diametrically through the damper 13 and the liquid filling passage 24.

Supposing that the groove 29 is not provided, the high-pressure side pressure receiving chamber 9 and the high-pressure side isolated chamber 5 are communicated solely through the conduit 11 formed at the center of the pressure receiving body 2, so that the transmission of pressure through the fill liquid in the pressure receiving chamber 9 may be delayed to deteriorate the response characteristic. To avoid this, in the illustrated embodiment, the delay of transmission of pressure is eliminated by the presence of the groove 29 formed in the pressure receiving body 2 as shown in FIG. 7.

Needless to say, a similar groove for improving the pressure transmission characteristic may be formed also in the pressure receiving body 3 of the low-pressure side, although FIG. 7 shows only the groove 29 formed in the pressure-receiving body 2 of the high-pressure side.

As having been described, the present invention offers the following advantages.

(1) No organic matter resides in the space filled with fill liquid.

(2) The single-side pressure effect and the static pressure effect are reduced remarkably.

(3) The semiconductor sensor is protected against overload.

Thus, the invention provides a differential pressure transmitter incorporating a semiconductor sensor, exhibiting an improved stability and having a compact construction easy to fabricate.

What is claimed is:

1. A differential pressure transmitter comprising:
   a pressure receiving body assembly;
   two seal diaphragms disposed at both sides of said pressure receiving body assembly and forming, on both sides of said pressure receiving assembly, pressure receiving chambers for receiving pressures of a high-pressure fluid and a low-pressure fluid, respectively;
   a central diaphragm disposed in said pressure receiving body assembly and defining two isolated chambers which communicate with respective one of said pressure receiving chambers;
   a semiconductor sensor having a resistance pattern formed on one side thereof and having thick-walled peripheral portion and thick-walled central portion at the other side thereof;
   a hollow supporting member attached to the peripheral portion of said other side of said semiconductor sensor; and
   a sealing member to which said supporting member is fixed, said sealing member having a first passage for providing a communication, through an internal cavity of said supporting member, between said other side of said semiconductor sensor and one of said pressure receiving chambers, and a second passage providing a communication between said one side of said semiconductor sensor and the other pressure receiving chamber;
   said semiconductor sensor being disposed such that the side thereof having said resistance pattern faces said pressure receiving body assembly.

2. A differential pressure transmitter as claimed in claim 1, wherein said sealing member includes a printed circuit board through which an electric signal from said semiconductor sensor is derived and disposed in the vicinity of said semiconductor sensor, and a terminal sealed in a hermetic manner.

3. A differential pressure transmitter as claimed in claim 1, wherein said pressure receiving body assembly includes a first member having a substantially U-shaped cross-section and a second member fitted in said first member.

4. A differential pressure transmitter as claimed in claim 3, wherein said first and second members are bonded to each other by electron beam welding, the depth of weld being 4 mm or greater.

5. A differential pressure transmitter as claimed in claim 3, wherein said central diaphragm is bonded to said first member by electron beam welding.

6. A differential pressure transmitter as claimed in claim 5, wherein the weld width of said electron beam welding is 0.5 to 2 times as large as the thickness of said central diaphragm.

7. A differential pressure transmitter as claimed in claim 3, wherein said second member has a projection for pressing said central diaphragm against said first member.

8. A differential pressure transmitter as claimed in claim 7, wherein said central diaphragm is bonded to said first member by electron beam welding, and said projection presses the portion of said central diaphragm inside of the welded portion.

9. A differential pressure transmitter comprising:
a pressure receiving body assembly;
two seal diaphragms disposed at both sides of said pressure receiving body assembly and forming, on both sides of said pressure receiving body assembly, pressure receiving chambers for receiving pressures of a high-pressure fluid and a low-pressure fluid, respectively,
a central diaphragm disposed in said pressure receiving body assembly and defining two isolated chambers which communicate with respective one of said pressure receiving chambers;
a semiconductor sensor having a resistance pattern formed on one side thereof and having thick-walled peripheral portion and thick-walled central portion at the other side thereof;
a hollow supporting member attached to the peripheral portion of said other side of said semiconductor sensor;
a sealing member to which said supporting member is fixed, said sealing member having a first passage for introducing a first fluid pressure to said other side of said semiconductor sensor through an internal cavity of said supporting member and a second passage for introducing a second fluid pressure to said one side of said semiconductor sensor;
a ceramic substrate disposed in said second conduit adjacent to said semiconductor sensor, said ceramic substrate being adapted to transmit to the outside an electric signal corresponding to the pressure and generated by said semiconductor sensor;
a connector casing portion encasing connectors for electrically connecting said ceramic substrate to the outside so that said electric signal may be delivered to the outside; and
a connecting member having a third passage and a fourth passage through which said first and second passages are communicated with corresponding pressure receiving chambers;
said semiconductor sensor being disposed such that the side thereof having said resistance pattern faces said pressure receiving body assembly.

10. A differential pressure transmitter as claimed in claim 9, wherein said sealing member is covered at its peripheral portion with a metallic member made of a metal having a high corrosion resistance.

11. A differential pressure transmitter as claimed in claim 9, wherein said pressure receiving body assembly has grooves formed in both side surfaces thereof, said grooves being connected to passages providing communications between said pressure receiving chambers and said isolated chambers.

* * * * *